United States Patent
Pickett et al.

[11] Patent Number: 5,835,292
[45] Date of Patent: *Nov. 10, 1998

[54] SLIMMING MIRROR

[75] Inventors: William R. Pickett, Blue Springs, Mo.; James D. Parks, Olathe, Kans.

[73] Assignees: Rockwood Industries, Inc.; Franklin Pharmaceuticals, both of Kansas City, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 867,545

[22] Filed: Jun. 2, 1997

[51] Int. Cl.$^6$ .............................. G02B 5/08; G02B 7/182; A63G 31/00

[52] U.S. Cl. .............................. 359/846; 359/872; 472/63

[58] Field of Search ..................................... 359/846, 847, 359/849, 872; 472/63, 72

[56] References Cited

U.S. PATENT DOCUMENTS

| | | | |
|---|---|---|---|
| 713,643 | 11/1902 | Jackson | 359/847 |
| 840,084 | 1/1907 | Muller . | |
| 3,004,472 | 10/1961 | Buxton . | |
| 3,140,347 | 7/1964 | Cohen . | |
| 3,445,157 | 5/1969 | Zitter . | |
| 3,610,738 | 10/1971 | Bochmann | 359/847 |
| 3,832,039 | 8/1974 | Doolittle | 359/846 |
| 4,196,972 | 4/1980 | Rawlings | 359/849 |
| 4,280,753 | 7/1981 | Neubauer | 359/846 |
| 4,575,200 | 3/1986 | Humiston | 359/849 |
| 4,971,312 | 11/1990 | Weinreich | 272/8 M |

*Primary Examiner*—Cassandra C. Spyrou
*Assistant Examiner*—Mark A. Robinson
*Attorney, Agent, or Firm*—Hovey, Williams, Timmons & Collins

[57] ABSTRACT

A mirror apparatus includes a flexible mirror mounted in a frame and a shuttle assembly shiftable along a generally upright axis having a cam element for selectively engaging a cam follower coupled with the rear face of the mirror in order to flex the mirror outwardly.

20 Claims, 4 Drawing Sheets

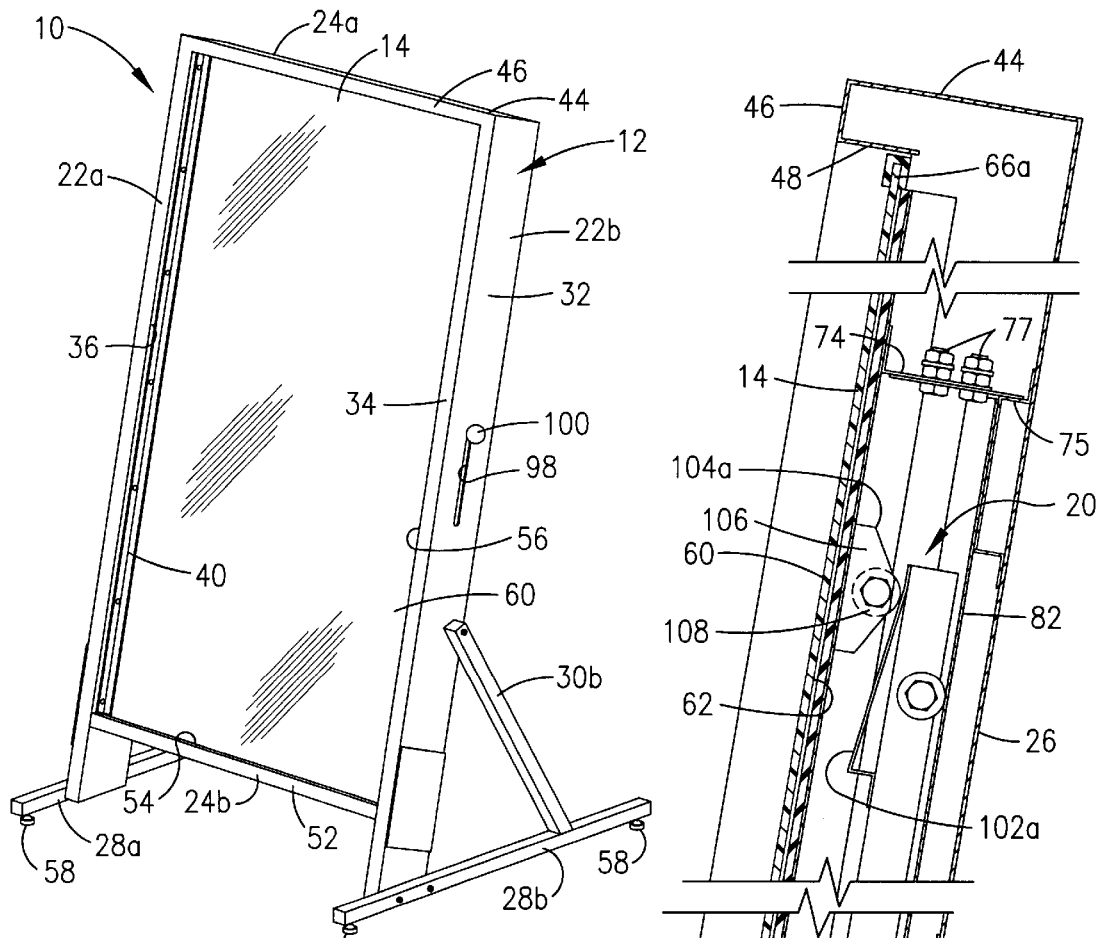
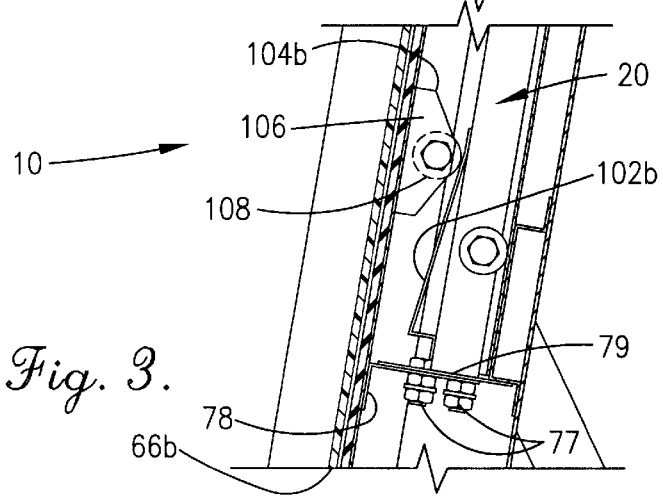

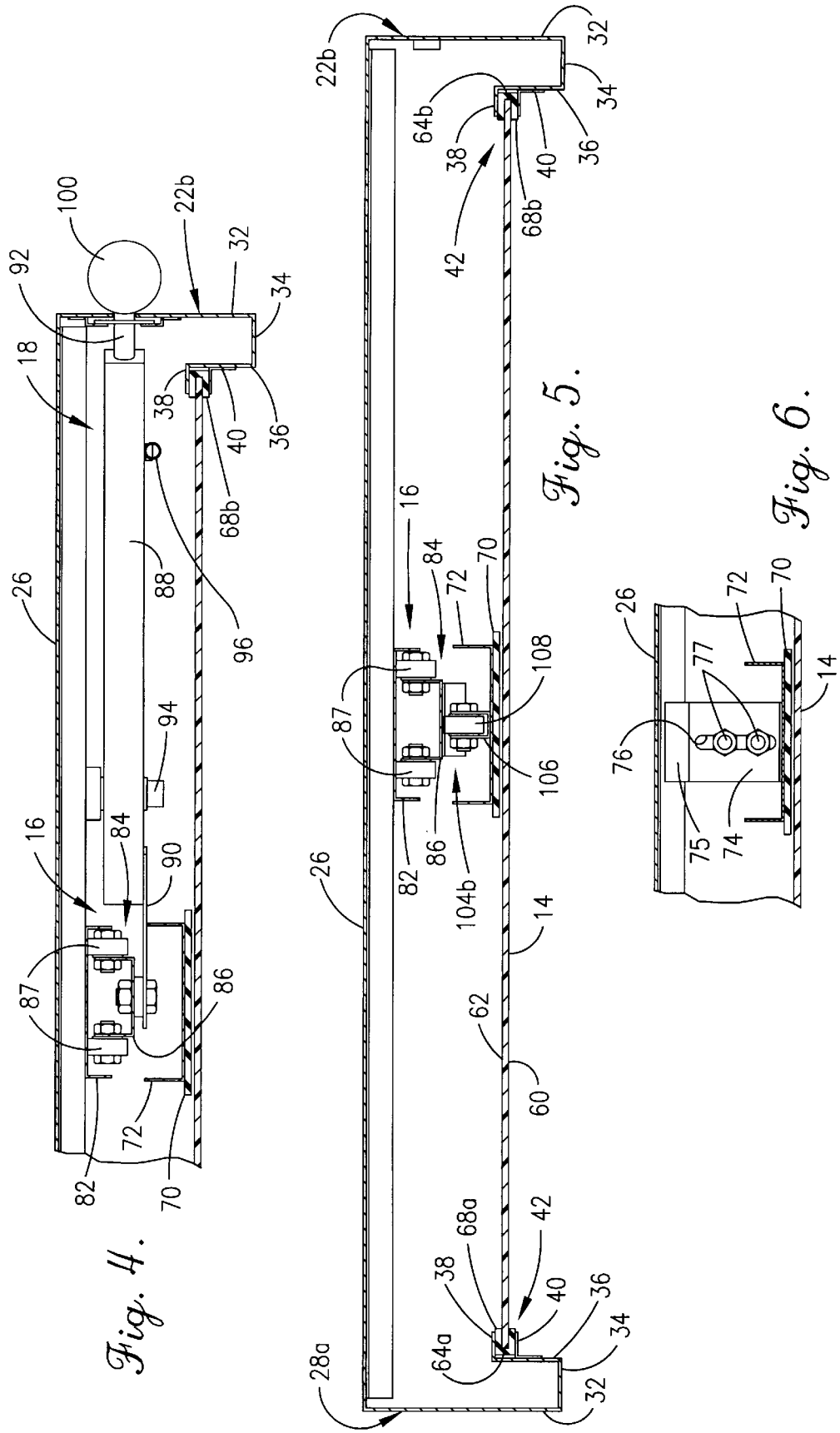

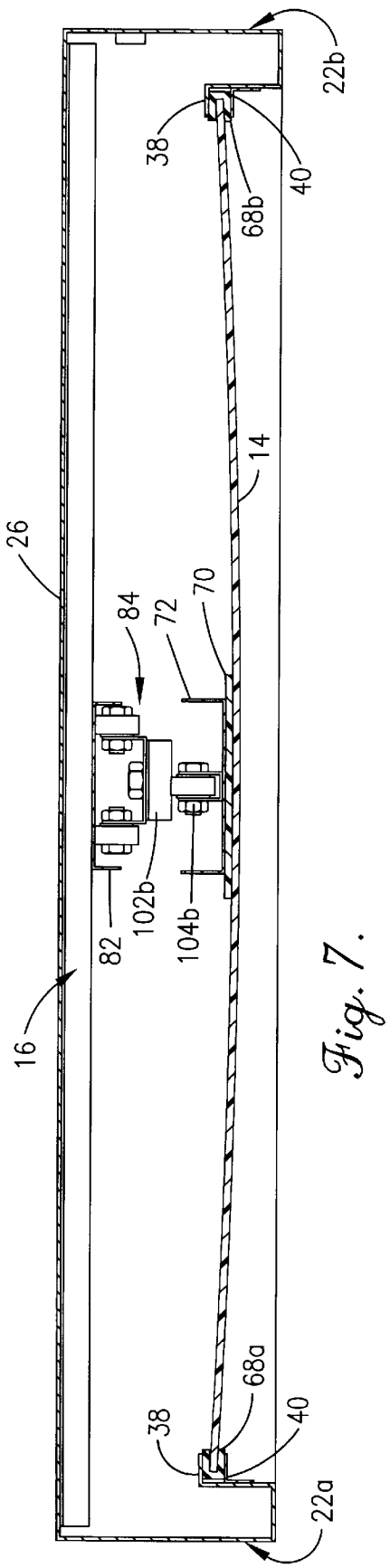
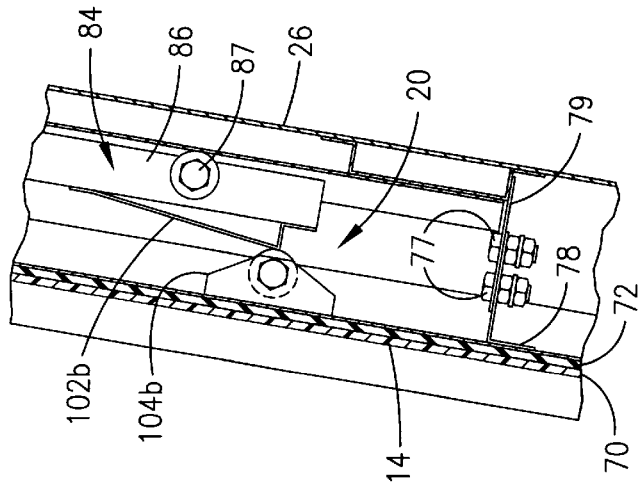
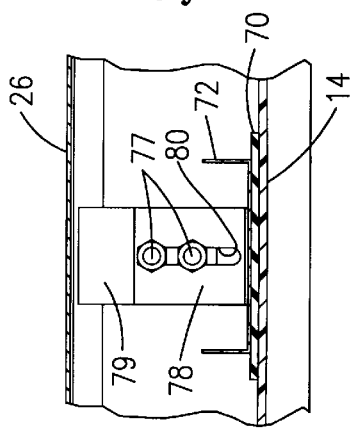

SLIMMING MIRROR

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The present invention relates to the field of flexible mirrors. In particular, the invention concerns a mirror apparatus including a flexible mirror mounted in a frame, and a shuttle assembly shiftable along the generally upright, centerline axis and having a cam element for selectively engaging a cam follower coupled with the rear face of the mirror in order to flex the mirror outwardly.

2. Description of the Prior Art

The prior art discloses a variety of mechanisms for selectively flexing a mirror in order to alter the appearance of a reflected image. Such can be used, for example, to present a slimmer image of a person as inducement for a weight loss program. These prior art mechanisms, however, tend to be mechanically complex or difficult to use.

SUMMARY OF THE INVENTION

The mirror apparatus of the present invention solves the prior art problems discussed above and presents a distinct advance in the state of the art. More particularly, the slimming mirror hereof is mechanically simple and easy to use.

The preferred embodiment of the present invention includes a flexible mirror mounted in a frame, a shuttle assembly shiftably coupled with the frame for selective movement along the generally upright centerline axis, an operator for selectively positioning the shuttle assembly, and a camming mechanism for selectively flexing the mirror in response to selective positioning of the shuttle assembly. In preferred forms, the shuttle assembly includes a carriage having a pair of spaced cam elements positioned to engage similarly spaced cam followers coupled with the rear face of the mirror. Other preferred aspects of the present invention are disclosed herein.

BRIEF DESCRIPTION OF THE DRAWINGS

FIG. 1 is a pictorial view of the preferred mirror apparatus in accordance with the present invention;

FIG. 3 is a partial sectional view taken along line 3 —3 of FIG. 2;

FIG. 4 is a partial sectional view taken along line 4 —4 of FIG. 2;

FIG. 5 is a sectional view taken on line 5 —5 of FIG. 2;

FIG. 6 is a partial sectional view taken along line 6 —6 of FIG. 2;

FIG. 7 is a partial sectional view similar to FIG. 5 but showing the mirror in the flexed position;

FIG. 8 is a partial sectional view similar to FIG. 6 but showing the mirror in the flexed position; and FIG. 9 is a partial, side sectional view similar to FIG. 3 but showing the mirror in the flexed position.

DETAILED DESCRIPTION OF THE PREFERRED EMBODIMENT

Figure 2:
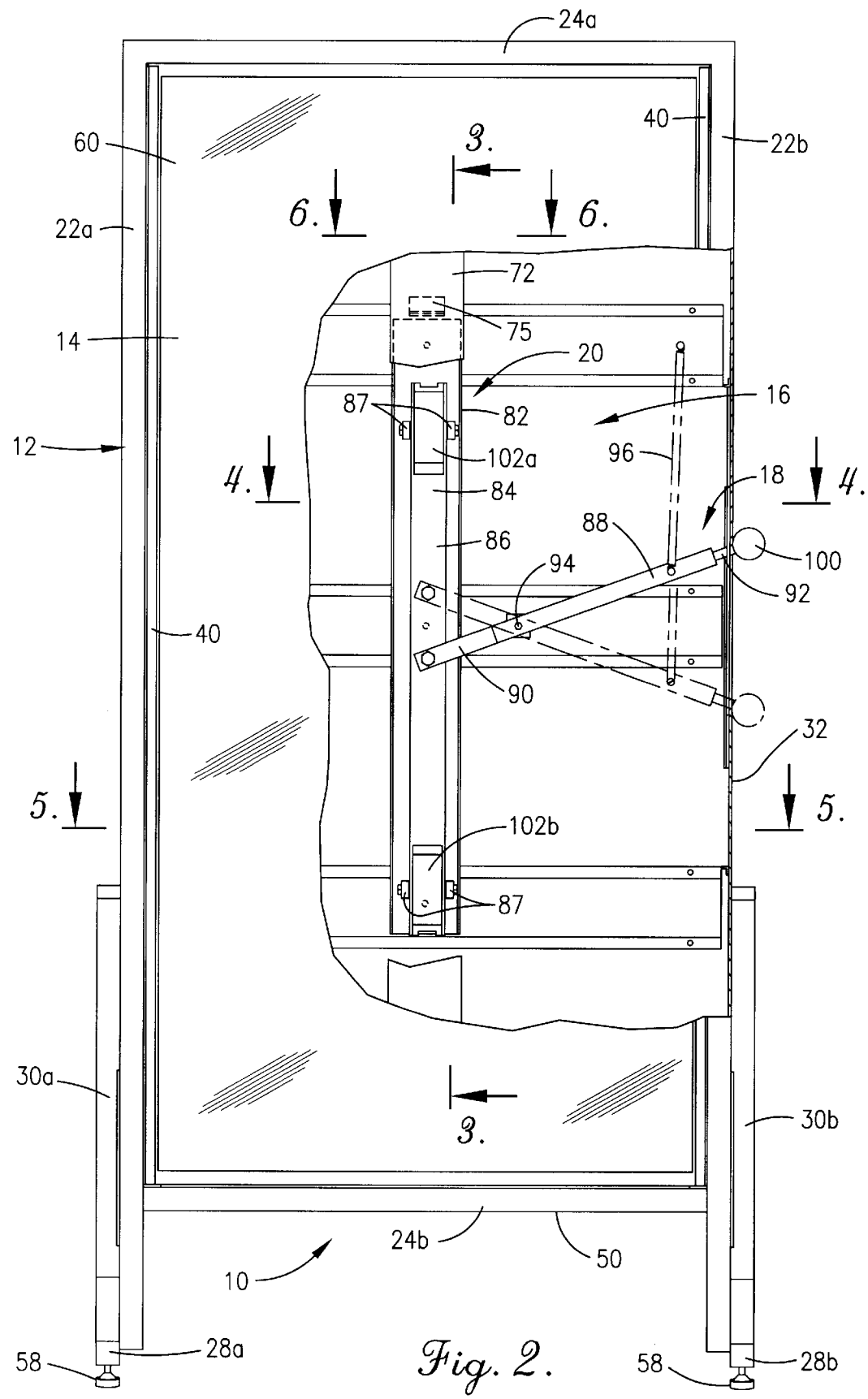
FIG. 2 is a front elevational view of the apparatus of FIG. 1 with portions cut away for clarity.

The drawing figures illustrate preferred mirror apparatus 10 in accordance with the present invention. Apparatus 10 broadly includes frame 12, flexible mirror 14, shuttle assembly 16, operator 18 and camming mechanism 20.

As best viewed in FIGS. 1, 3 and 5, frame 12 includes left and right stiles 22$a$ and 22$b$, top and bottom rails 24$a$ and 24$b$, back wall 26, base legs 28$a$ and 28$b$ and braces 30$a$ and 30$b$. Frame components 22—26 are preferably formed from sheet metal to present the configuration illustrated in the drawing figures.

As best shown in FIG. 5, each stile 22$a,b$ includes outboard wall 32, front wall 34, inboard wall 36 formed to present an inwardly extending lip 38, and angle bracket 40 connected by screws to inboard wall 36 and spaced from lip 38 to form mirror-receiving channel 42. Top rail 24$a$ extends between the upper edges of stiles 22$a,b$ and includes top wall 44, front wall 46 and inboard wall 48. Bottom rail 24$b$ extends between stiles 22$a,b$ above the lower ends thereof and includes bottom wall 50, front wall 52 and inboard wall 54. Stiles 22$a,b$ and rails 24$a,b$ cooperatively define mirror opening 56.

Base leg 28$a$ is connected to outboard wall 32 of left stile 22$a$ a flush with the lower edge thereof and includes a pair of spaced support feet 58. The lower end of left stile 22$a$ is cut at an angle of about 9.5° and brace 30$a$ interconnects base leg 28$a$ with outboard wall 32 of stile 22$a$ in order to support frame 12 at this angle. Similarly, the lower end of the right stile 22$a$ is cut at the same angle, and base leg 28$a$ is connected to outboard wall 32 of stile 22$b$ flush with the bottom edge thereof. Leg 28$b$ also includes a pair of spaced support feet 58, and brace 30$b$ interconnects leg 28$b$ with the outboard wall of right stile 22$b$.

Flexible mirror 14 presents a planar configuration when in the unflexed position as illustrated in FIGS. 1–6 and 8 and is preferably composed of tempered safety glass, ⅛ to 3/16 inch thick, but could also be composed of acrylic, plexiglass polished aluminum, polished stainless steel and so forth. Mirror 14 is located in mirror opening 56 and presents mirror face 60, rear face 62, left and right side edges 64$a$ and 64$b$, and top and bottom edges 66$a$ and 66$b$. As shown in FIG. 5, left, U-shaped, rubber gasket 68$a$ is positioned in channel 42 of left stile 22$a$ and receives and supports left side edge 64$a$. Similarly, right, U-shaped, rubber gasket 68$b$ is positioned in channel 42 of right stile 22$b$ and receives and supports right side edge 64$b$.

As best view in FIGS. 4–8, resilient rubber strip 70, is adhered to mirror rear face 62 and extends along the generally upright, centerline axis of apparatus 10. Channel-shaped support member 72 is adhered to the outboard face of strip 70 and also extends along the upright center line of mirror 14.

Angle-shaped upper, mirror bracket 74 is connected to support member 72 adjacent the upper edge thereof and extends toward frame back wall 26 and further includes slot 76. Angle-shaped upper, support bracket 75 extends from back wall 26 and is connected by a pair of bolt fasteners 77 to mirror bracket 74 extending through slot 76. As best viewed in FIGS. 6 and 8, brackets 74 and 75 support mirror 14 while allowing outward flexing because of the slotted connection. Similarly, lower bracket 78 is connected to support member 72 adjacent the lower end thereof, extends toward back wall 76, and includes slot 80 defined therein. Lower support bracket 79 is connected to back wall 26 and is coupled with lower mirror bracket 78 using a pair of bolt fasteners 77 extending through slot 80 for supporting mirror bottom edge 66*b*.

Shuttle assembly 16 includes channel-shaped guide member 82 connected to the inboard surface of frame back wall 26 along the center line thereof and in registration with support member 72 as illustrated in FIG. 5. Assembly 16 also includes shuttle 84 made up of channel-shaped carriage 86 opposed to the channel-shaped support member 72-- and a pair of rollers 87 coupled adjacent each end of carriage 86 for rollings shiftable movement within guide member 82 and thereby along the axis of apparatus 10.

Operator 18 includes operating arm 88, extension bar 90 connected to the inboard end of arm 80 and rotatably coupled with carriage 86 at about the midpoint thereof, operating handle 92 connected to the outboard end of arm 88, pivot mount 94 pivotally coupling arm 88 with back wall 26, and spring 96 with one end coupled with back wall 26 above operator 18 and with the other end connected to arm 88 between handle 92 and pivot mount 94. Handle 92 extends through handle slot 98 defined in outboard wall 32 of right stile 22*b*so that handle ball 100 is accessible for manual grasping and operation on the exterior of frame 12.

Camming mechanism 20 includes ramp-shaped, upper cam element 102*a*coupled with carriage 86 adjacent the upper end thereof and extending toward mirror rear face 62, and ramp-shaped, lower cam element 102*b*coupled with carriage 86 adjacent the lower end thereof and extending toward mirror rear face 62. Mechanism 20 also includes upper cam follower 104*a*and lower cam follower 104*b*connected to support member 72 adjacent the respective ends thereof and spaced the same as cam elements 102*a,b*. Each cam follower includes U-shaped bracket 106 coupled with support member 72 with cam roller 108 rotatably mounted to the arms of bracket 106 as illustrated in FIGS. 3 and 5.

In use, spring 96 biases handle 92 upwardly with the weight of shuttle 84 providing further bias toward the unflexed, planar position of mirror 14 (FIGS. 1–6). In this position, shuttle 84 is positioned at its lower end of travel, and cam elements 102*a,b* and cam followers 104*a,b* are not engaged. As a result, mirror 14 presents a planar configuration. Additionally, mirror brackets 74 and 78 are positioned at their inward limit of travel toward back wall 26. In this position, a person standing in front of mirror 14 is presented with an unaltered reflected image.

To change the reflected image, a user grasps handle ball 100 and pushes downwardly against the bias of spring 96. This causes operating handle 92 to pivot about pivot mount 94 thereby shifting, that is, raising shuttle 84 within guide member 82 and linearly along the axis of apparatus 10. As shuttle 84 travels upwardly, cam elements 102*a,b* engage cam followers 104a,b (see FIG. 9) and push mirror 14 outwardly, thereby flexing mirror 14 to present a convex configuration relative to mirror face 60 as illustrated in FIG. 7. As mirror 14 flexes outwardly, mirror support brackets 74 and 78 also shift outwardly as shown in FIG. 8. FIGS. 7, 8 and 9 illustrate the flexed position at the limits of travel of the various components with handle ball 100 at the lower end of handle slot 98.

It will be appreciated that handle ball 100 can be shifted to any selected position along its path of travel in order to achieve a desired image effect. With mirror 14 flexed outwardly, a person standing in front of apparatus 10 is presented with a slimmer image, which can be of substantial benefit in providing motivation for a weight loss program. When operation is complete, the user relaxes the force on handle ball 100 which returns under the bias of spring 26 and under the bias of the flexed mirror to the unflexed position for mirror 14.

Those skilled in the art will appreciate that the present invention encompasses many variations in the preferred embodiment described herein. Having thus described the preferred embodiment, the following is claimed as new and desired to be secured by Letters Patent:

We claim:

1. A mirror apparatus comprising:
   a frame;
   a flexible mirror presenting a mirror face and a rear face and flexibly coupled with said frame for allowing flexing of said mirror relative to said frame, said mirror presenting a generally upright centerline axis; a shuttle assembly shiftably coupled with said frame adjacent said mirror rear face for allowing substantially linear shifting of said shuttle assembly along said upright centerline axis generally parallel to said mirror;
   operating means for selectively positioning said shuttle assembly along said upright centerline axis; and
   camming means coupled with and positioned between said mirror rear face and shuttle assembly for selective flexing of said mirror along said upright centerline axis in response to selective linear positioning of said shuttle assembly along said upright centerline axis.

2. The apparatus as set forth in claim 1, said camming means including a cam element coupled with one of said rear face and shuttle assembly, and a cam follower coupled with the other of said rear face and assembly so that shifting of said shuttle assembly causes said cam follower to follow said cam element for flexing said mirror.

3. The apparatus as set forth in claim 2, said cam follower being coupled with said mirror rear face, said cam element being coupled with said shuttle assembly.

4. The apparatus as set forth in claim 3, said shuttle assembly including
   a shuttle channel member having structure defining a channel,
   a shuttle positioned in and shiftable in said channel along said axis,
   said cam element being coupled with said shuttle and extending toward said rear face and positioned for engaging said cam follower upon shifting of said shuttle for flexing said mirror outwardly along said upright centerline axis so that said mirror face presents a convex configuration generally along the upright center line thereof.

5. The apparatus as set forth in claim 4, said apparatus including a pair of said cam followers coupled with said rear face and spaced apart along said axis and a corresponding pair of said cam elements coupled with said shuttle and spaced apart along said axis.

6. The apparatus as set forth in claim 1, said mirror presenting top and bottom edges, and fixed opposed side edges coupled with said frame with said top and bottom edges being operable for convex movement.

7. The apparatus as set forth in claim 1, said operating means including an operating member having opposed ends and pivotally coupled therebetween with said frame with one of said ends coupled with said shuttle assembly and with the other of said ends accessible for manual grasping and shifting in order to shift said member and thereby said shuttle assembly.

8. The apparatus as set forth in claim 1, said mirror being composed of tempered safety glass.

9. The apparatus as set forth in claim 1, said apparatus being tilted at an acute angle relative to vertical.

10. The apparatus as set forth in claim 9, said acute angle being 9.5°.

11. The apparatus as set forth in claim 1, said camming means including an upper cam element adjacent a top rail of said frame, an upper cam follower adjacent said upper cam element, a lower cam element spaced apart from said upper cam element and positioned adjacent a bottom rail of said frame, a lower cam follower adjacent said lower cam element, and said upper and lower cam elements and followers being positioned substantially on said upright centerline axis.

12. A mirror apparatus comprising:

a frame having a top rail, and a bottom rail, and a back wall;

a flexible mirror presenting a mirror face and a rear face and flexibly coupled with said frame for allowing central flexing of said mirror relative to said frame, said mirror presenting a generally upright ceterline axis;

a support member attached to the substantially parallel to the upright centerline axis;

a carriage to the frame substantially parallel to the upright centerline axis;

a shuttle assembly shiftably coupled with said frame adjacent said mirror rear face between the support member and the carriage for allowing shifting of said shuttle assembly along said upright centerline axis generally parallel to said mirror;

operating means for selectively positioning said shuttle assembly along said upright centerline axis; and camming means coupled with and positioned between said mirror rear face and shuttle assembly for selective central flexing of said mirror along said upright center axis in response to selective positioning of said shuttle assembly along said upright centerline axis.

13. The apparatus as set forth in claim 12, said camming means including an upper cam element adjacent the top rail of the frame, an upper cam follower adjacent the upper cam element, a lower cam element spaced apart from the upper cam element and positioned adjacent the bottom rail of the frame, a lower cam follower adjacent the lower cam element, and the upper and lower cam elements and followers being positioned substantially on the upright centerline axis for central flexing of said mirror along said upright centerline axis at two locations.

14. The mirror according to claim 12 wherein the support member comprises a channel shaped support member, and the carriage comprises a channel-shaped carriage opposed to the channel-shaped support member.

15. The mirror according to claim 12 wherein the shuttle assembly comprises a plurality of rollers adjacent the carriage for rolling movement of the shuttle assembly relative to the carriage.

16. The mirror according to claim 12 further comprising a slotted connection between the support member and the carriage permitting outward flexing of the mirror relative to the back wall.

17. A mirror apparatus comprising:

a frame and a bottom rail;

a flexible mirror presenting a reflective mirror face and a rear face and flexibly coupled with said frame for allowing flexing of said mirror relative to said frame, frame, said mirror presenting a generally said mirror presenting a generally upright centerline axis;

a shuttle assembly having a guide member shiftably coupled with said frame adjacent said mirror rear face for allowing shifting of said shuttle assembly along said upright centerline axis generally parallel to said mirror;

operating means for selectively positioning said shuttle assembly along said upright centerline axis; and camming means coupled with and positioned between said mirror rear face and shuttle assembly for selective flexing of said mirror along said upright centerline axis at a plurality of locations in response to selective positioning of said shuttle assembly along said upright centerline axis.

18. The mirror according to claim 17, said camming means including a plurality of cam elements spaced apart along the upright centerline axis and a plurality of roller cam followers operatively positioned relative to the cam elements and spaced apart along the upright centerline axis.

19. The mirror according to claim 17 further comprising a rubber strip interposed between the shuttle assembly and the mirror, and wherein the camming means comprises a cam element, and the guide member comprises a channel-shaped guide member having the cam element attached thereto.

20. The mirror according to claim 17 wherein the camming means comprises a ramp-shaped cam element.

* * * * *